(12) United States Patent
Steinhardt

(10) Patent No.: US 10,753,748 B2
(45) Date of Patent: Aug. 25, 2020

(54) NAVIGATION SYSTEM AND METHOD FOR ERROR CORRECTION

(71) Applicant: HONDA RESEARCH INSTITUTE EUROPE GMBH, Offenbach/Main (DE)

(72) Inventor: Nico Steinhardt, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 292 days.

(21) Appl. No.: 15/489,885

(22) Filed: Apr. 18, 2017

(65) Prior Publication Data
US 2017/0307379 A1  Oct. 26, 2017

(30) Foreign Application Priority Data

Apr. 20, 2016 (EP) ................................ 16166189
Jun. 27, 2016 (EP) ................................ 16176424

(51) Int. Cl.
*G01C 21/16* (2006.01)
*G01S 19/47* (2010.01)
*G01S 19/49* (2010.01)

(52) U.S. Cl.
CPC ............ *G01C 21/165* (2013.01); *G01S 19/47* (2013.01); *G01S 19/49* (2013.01)

(58) Field of Classification Search
None
See application file for complete search history.

(56) References Cited

U.S. PATENT DOCUMENTS

2004/0133346 A1  7/2004  Bye et al.
2008/0077325 A1*  3/2008  Bye .................... G01C 21/165
                                              701/500

(Continued)

FOREIGN PATENT DOCUMENTS

DE    10 2012 216 215 A1    3/2013
DE    10 2014 211 166 A1    5/2015
WO    WO 2012/049492 A1    4/2012

OTHER PUBLICATIONS

Thomas Dall Larsen et al., Incorporation of Time Delayed Measurements in a Discrete-Time Kalman Filter, Niels Kjolstad Poulsen, Department of Mathematical Modelling, Technical University of Denmark, 6 pages.

(Continued)

*Primary Examiner* — John Olszewski
*Assistant Examiner* — Gerrad A Foster
(74) *Attorney, Agent, or Firm* — Squire Patton Boggs (US) LLP

(57) ABSTRACT

A system corrects errors of a measurement system. The system comprises base measurement system BS and a correction system. BS sensor data is acquired and provided to an algorithm. The data is stored associated with a time stamp indicating time of sensing. Output values are calculated and stored with time stamps indicating time of the sensor data upon which the output values are calculated. Data having corresponding time stamps are supplied to a filter where correction values and correction increments are calculated. The correction increments reflect the change of error in a base system output value over time due to integration or summing up BS sensor data errors in the processing algorithm. The correction values are applied to the BS data and corrected base navigation output values are calculated. These output values are corrected by the correc- (Continued)

tion increments. Output values of the processing algorithm are further processed in succeeding applications.

8 Claims, 2 Drawing Sheets

(56) References Cited

U.S. PATENT DOCUMENTS

2014/0371990 A1 12/2014 Steinhardt
2015/0153460 A1* 6/2015 Fleming ............... G01C 21/165
                                                                    702/150

OTHER PUBLICATIONS

Dipl.-Ing. Nico Steinhardt, "Eine Architektur zur Schätzung kinematischer Fahzeuggtößen mit integrierter Qualitätsbewerfung durch Sensordatenfusion", 2014, pp. 1-190.
European Search Report dated Jan. 11, 2017 corresponding to European Patent Application No. 16176424.6.

* cited by examiner

NAVIGATION SYSTEM AND METHOD FOR ERROR CORRECTION

BACKGROUND

Field

Method for correcting errors of a measurement system output and integrated navigation system.

Description of the Related Art

The invention relates to a method for correcting errors of a system output, the system comprising a base measurement system and a correction system for correcting at least errors of the base measurement system. The invention is also related to an integrated navigation system adapted to carry out such method.

Many systems that compute, on the basis of sensor measurements, a desired value or information or estimation, for example movement of objects, encounter significant inaccuracy in the results due to uncertainties or errors in the input values from the sensors as well as from processing. In order to correct for those inaccuracies or input errors, it is known to use additional information derived from other sensors as reference or correction measurement. In many cases, it is possible to combine in that way a base system using measurement technique which is fast, easy to handle, always available and easy to process. This processing can then be combined with additional measurements that are capable of delivering more precise results but the processing of which is for example more time consuming and thus not available in any situation. Furthermore, it might be the case that these additional measurements at certain points in time are not available at all or only with a delay. Thus, the more precise measurement is only used in order to correct the less accurate measurement from time to time. A prominent example of such an approach can be found in so-called integrated navigation systems (INS). Such an integrated navigation system consists typically of an inertial measurement unit (IMU) which measures three dimensional accelerations and angular rates. The measured values are then further processed by means of a strap-down algorithm (SA) which computes at least velocity, pose and position for example of a vehicle or a navigation device held by a person. The combination of IMU and SA can also be called as a base navigation system (BNS) which is one example for a base measurement system as mentioned above.

In such a system the measurement of the three dimensional acceleration and angular rates is of course always available because it is directly possible to recognize a movement and/or a change in movement of a vehicle or the device where the integrated navigation system is mounted. But the sensors used in such a system often suffer from errors like for example an offset and also the strap-down algorithm processing the base measurement sensor data uses internal variables and parameters that may cause further errors when further processing of the sensor data is made. Such internal strap-down algorithm errors may for example be caused by integrating sensor offsets. These results from integration of values that are delivered from the sensors and which as mentioned above may comprise an uncorrected offset. An example for a navigation system is the integration of a measured acceleration to calculate a velocity. Thus, in order to achieve a satisfying position, velocity and pose result of such a navigation system's correction of the errors of the output elements is necessary. One approach that is well-known in the art is the implementation of a fusion filter, for example an extended error state space Kalman-filter. By means of such a Kalman-filter (or another filter type) deviations between the results of the base navigation system and a reference measurement is exploited in order to compute correction values which then can be fed back to the base navigation system in order to correct the navigation system output or sensor offset. One reference or correction measurement might be provided by a GPS (global positioning system) that delivers a rather precise position, but is of course not always available, for example in case that the vehicle is in a tunnel or for any other reasons the satellites that are necessary for calculating an actual position are shaded. Another correction measurement might be performed by using odometry for example.

Generally, such reference measurement may of course also suffer from errors. In particular, when a GPS system is used, random errors have to be mentioned, for example multipath reception of a satellite signal. Such errors furthermore violate a basic assumption of a Kalman-filter, because such errors have no zero-mean and thus, no Gaussian distribution.

Various approaches have been described in the past already to improve the detection and compensation of erroneous measurements.

But there is another aspect that needs to be considered when trying to improve an error correction of such a system. Errors that occur can be either random errors or systematic errors. A reason for such systematic errors to occur is that in the process of performing correction calculation some of the data needed for the correction algorithm might be delayed. In particular, in most applications and this is particularly true also for integrated navigation systems, the results of the correction measurements may be available well after the results of the strap-down algorithm and the BNS-sensor data. Thus, if a correction is performed on the basis of the data as soon as the respective correction sensor data is available, a systematic error is caused because of the time inconsistency of the used data. A reason is that between the point in time when the correction data was sensed and the most recent sensing of the base system used for the current strap-down algorithm output, the vehicle has already moved on. In such a base navigation system as an example for a general base measurement system usually data is acquired by using an IMU (Inertial Measurement Unit). If a GNSS system (Global Navigation Satellite System) is used to produce data of the basis on which correction values are calculated, the processing of the received satellite signals takes more time than processing of the data of the IMU. Thus, there is a time difference (time lag) because when the result of the satellite signal data processing is available as an input for a correction system already newer data of the IMU have been processed by the strapped-down algorithm. Thus, the input data for the correction system has a different time basis. The difference in time of the respective sensed data is also called "lag time".

In the past, there have been made a plurality of attempts in order to minimize the errors on the output side of a base measurement system such as a base navigation system. Of course, according to one approach, it could be awaited until all measurements including the one with the longest lag time have arrived. This is in fact only applicable to offline systems, but as can be easily understood practically unsuitable for real time applications. In such real time applications, it is necessary that the most recent sensed data of the BNS is processed as fast as possible and that the output result can be used for further processing or analysis immediately. Approaches such as forward-and-backward processing which eliminate the filter lag are also not suitable for real time processing, because they exclusively work on recorded data.

On the other side for real time applications, it is of course also necessary that the computational load is kept on a reasonable level. Approaches as suggested for example in "Corporation of time-delayed measurements in a Discrete-Time-Kalman-filter", 198 by T. D. Larsen et. al, it is suggested to base the calculation of the errors on the assumption that during lag time, the errors do not change. As a consequence, also delayed correction measurements can be taken into consideration. Thus, it is possible to use delayed measurements of the correction system when calculating errors to be used for current BNS sensor data. But the suggested approach is not suitable for dealing with asynchronuous-multi-sensor environments since the further assumption made says that no further "possibly also delayed" measurements are available during lag time. In multi-sensor environments this assumption is violated.

Another approach suggests that as soon as another delayed measurement is available, the whole correction algorithm is repeated and thus the filter results are re-computed. But this causes a high computational load and the fact that the filter results are recomputed even after they have been output leads to temporal inconsistencies.

Another approach is disclosed in "Eine Architektur zur Schätzung kinematischer Fahrzeuggrößen mit integrierter Qualitätsbewertung durch Sensordatenfusion" by Dr. Nico Steinhardt. Here a basic assumption is made that changes of the errors which are estimated by a fusion filter of the correction system are neglectable during lag time. Output values of the base measurement system, in the given example a base navigation system, are continuously computed and stored for the maximum expected lag time. Thus, in case that a delayed correction measurement is available, the age of the sensing data which are the basis for the correction can be determined, for example by using measurement time stamps. Thus, only data that correspond with respect to their time stamps can also be used to be input into the fusion filter. In case that the corresponding data of the base measurement system is not directly available, such data can be interpolated. Corrections calculated on the basis of such corresponding data are then applied to the output values of the base navigation system, but also to the already stored values. This is all based on the assumption that over the time interval for which values are stored, no change in the error has occurred. Since the stored values are the basis for future correction value calculations, the already performed correction will be included in all future correction calculations. Thus, the method can be used in a multi-sensor environment. Aspects of this approach are disclosed also in DE 10 2012 216 215 A1 and DE 10 2014 211 166 A1. But nevertheless, there is still one major drawback, because the described approach does not take into consideration that not for all of the stored measurements, application of a constant correction value is reasonable. This is because there are some errors that are summed up over time, for example because of integrating sensor data of an accelerometers with an offset in order to calculate a velocity. Such integrated or summed up errors of course clearly contradict the assumption of constant errors.

SUMMARY

The invention has been made in view of this particular problem in order to improve the error correction of a measurement system comprising a base measurement systems and a correction system. In particular, the error correction is improved in systems that have to deal with delayed availability of correction measurements compared to availability of sensor data of the base measurement system and the calculation of the base measurement system of the output.

The invention regards an integrated navigation system comprising a base navigation system and a correction system. The base navigation system and the correction system are adapted to execute the method for correcting errors according to the invention. The method for correcting errors of a measurement system output at first acquires base system sensor data and provides these sensor data to a processing algorithm. The base system sensor data are stored associated with a time stamp indicating the time of sensing. By the processing algorithms, base system output values are calculated. The calculated base system output values are stored. Again, associated with the base system output values a time stamp is stored indicating the time at which the sensor data was generated which is the basis for the calculated base system output values is stored. Furthermore, the correction system acquires correction system sensor data which is also associated with the time stamp that indicates the time of their sensing. The base system sensing data, the base system output values and the correction system sensor data are supplied to a fusion filter, wherein it is ensured that only such data and values are supplied to the fusion filter that have the same time stamps associated therewith. Based on the timely corresponding base system sensor data, base system output values and correction system sensor data, correction values and correction increments are calculated. It is to be noted that the correction increments reflect the change of an error in a base system output value over time due to integration and/or summing up base system sensor data while processing the base system sensor data by the processing algorithm. Then, the correction values are applied to the respective base system sensor data and on the basis of such corrected base system sensor data, the processing algorithm recalculates corresponding base system output values. On the other side, the correction increments are applied to the respective base system output values and thus take care of the time variability of the error, the time dependency of those base system output values that are calculated using for example an integration or summing up so that the error cannot be considered as being constant. These newly calculated base system output values which are derived on the basis of a recalculated, corrected input values for the processing algorithm as well as a correction of the calculated results by the correction increments are then stored. Still, associated with the stored recalculated base system output values is the time stamp that indicates the time of originally sensing the base system sensor data based on which the recalculated base system output values are calculated. Finally, the most recent output values of the processing algorithm are output for further processing, for example for navigation purposes.

Due major advantage of the present invention is that in addition to a correction of the base system output values by using a constant correction value, correction increments are calculated. As the correction increments are calculated and are then used to correct all the already stored but now recalculated base system output values, perform an additional correction that is not constant over time. Contrary, to the described methods of the prior art, correction values that are considered not to change during lag time and thus not change over the time period covered by a stored base system navigation system output values are used to correct not only the base system output values, but also the base system sensor data. Based on these corrected base system sensor data then re-computation of the base system output values is easily possible. The processing algorithm that is used in the base system is quick and thus the recalculation can be performed even in case of real time applications.

On the other side, the correction system only calculates correction values and correction increments after acquiring correction system sensor data with timely corresponding base system output values and timely corresponding base system sensor data. Thus, the slower correction algorithm that is performed by a fusion filter works on data from the past, but the base navigation system on the other side always operates on actual data. The correction always uses the latest correction values for recalculating the stored base system output values so that when a new correction loop is started always the best available data is used and thus, the accuracy of the overall system can be enhanced. This is also possible because for base navigation system output data, the correction of the base system output values that belong to a particular point in time is corrected by means of the correction increments for different points in time individually. Thus, all the stored base navigation output values have the same accuracy even if calculated for different points in time.

The proposed method and system is capable of an error correction for an unlimited multi-sensor environment. Because the base measurement system sensor data and the base measurement system output values are stored until a corresponding correction measurement is available, it can be asynchronuous and irregular measurements. Since the recalculation of base measurement output values is performed as described only in the base measurement system, but not for every newly available correction sensor data also on the correction system side, the method can be easily used in real time systems. The computational load of the algorithm is low compared to approaches that recalculate the correction values every time new correction measurements are available. Finally, as it is mentioned above, one of the main advantages is that the change of the error over time is also compensated in a correct way.

It is furthermore advantageous that the measurements of the correction system are collected by storing the collection system sensor data associated with their respective time stamps. Thus, it is possible to calculate collection values and correction increments not every time new correction system sensor data is provided and in particular, the plurality of correction system sensor data can be sorted according to time. Thus, if for example due to a particular sensor lag data which is available at a later point in time, but was in fact sensed to an earlier point in time, time inconsistencies are avoided. The data can be processed in the time order of generating the sensor data, but not in the sequence availability.

Furthermore, it is preferred that a predetermined threshold for discarding correction system sensor data is determined. This means that only correction system sensor data having a lag time which is below this predetermined threshold are used in the fusion filter. This ensures that also the correction system works close to the current point of time and if data is available only delayed, it is therefore not used. Furthermore, the latest correction values are stored that they are available at a later point of time. This has in particular the advantage that a correction with the so stored correction values can also be performed if no correction system sensor data with a lag time shorter than the predetermined threshold is currently available. In that case, the correction can be performed still on the basis of the stored correction values. But nevertheless, there is a correction of the base navigation system output at least taking account of the constant error.

The maximum lag time is advantageously defined and the calculation of correction values and correction increments is performed only after this maximum lag time has elapsed. This has the advantage that only at a point in time when it is known which of the correction system sensor data is available, the fusion filter calculates the correction values and the correction increments. As mentioned above, the time inconsistency because of late arrival of some correction system sensor data can be avoided.

The method is in particularly applied in a navigation system and thus the processing algorithm is a strap-down algorithm of such base navigation system. The fusion filter is particularly an extended error state space Kalman-filter.

The invention furthermore is related to an integration navigation system adapted to apply the above-mentioned method, wherein the base system comprises an inertial measurement unit, a processing unit for carrying out the strap-down algorithm and a fusion filter.

In particular, the correction system comprises at least one of GNSS, odometry, barometer, magnetometer, radars, stereo vision, laser scanners, rangefinders, landmarks, radio location.

DETAILED DESCRIPTION

Figure 1:
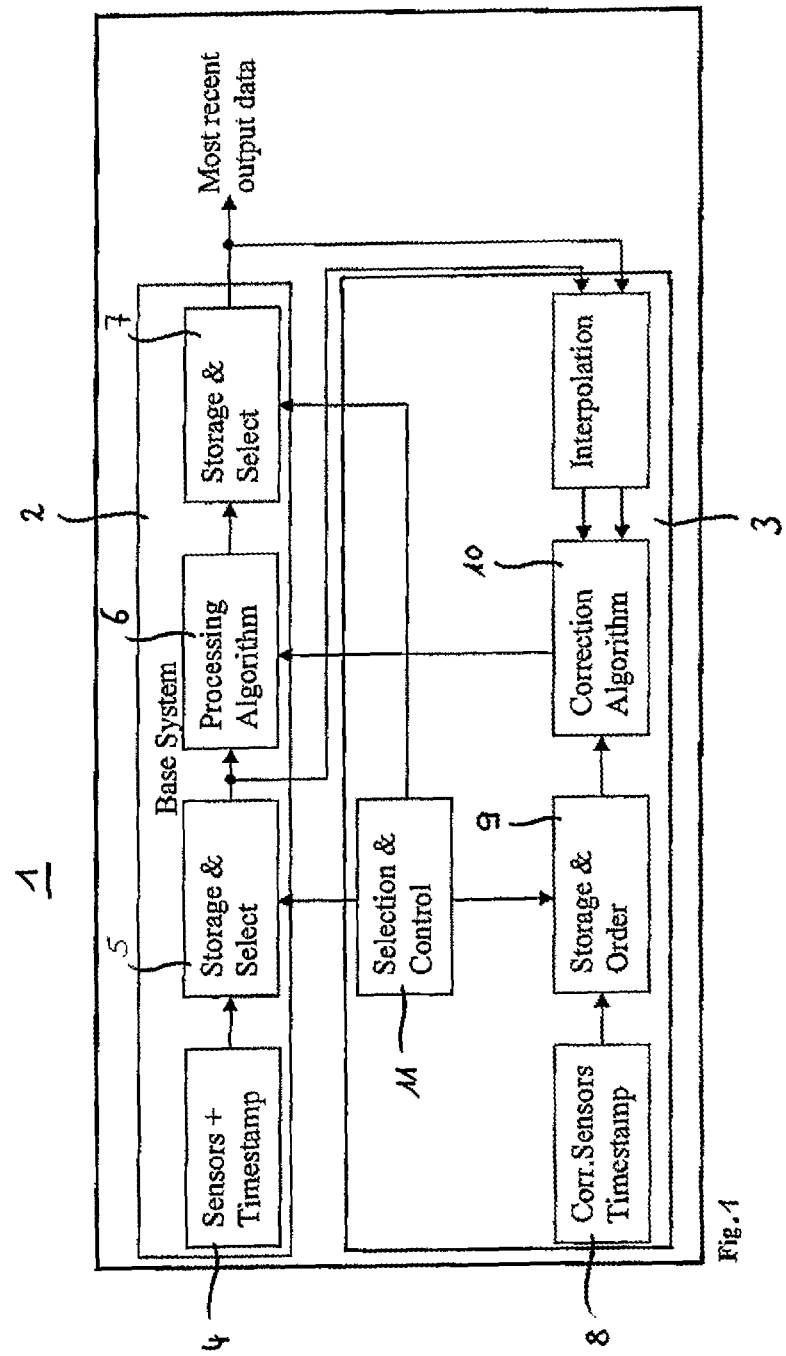
FIG. 1 shows a block diagram to illustrate the components of the integrated navigation system as one embodiment of the invention.

In FIG. 1 a block diagram is shown which illustrates the main functional blocks of a navigation system 1 which is exemplary for an embodiment of the present invention. The entire navigation system 1 consists of a base system 2 and a correction system 3. The base system 2 comprises base sensors 4 such as three dimensional accelerometers and gyroscopes that measure three dimensional accelerations and angular rates. Base system sensor data include naturally an error associated with each of the base sensors 4, for example a sensor offset.

The sensor data that is output by the base sensors 4 is supplied to a processing algorithm unit 6, for example a strap-down algorithm. By the strap-down algorithm output values are calculated from the base sensor data. These output values comprise for example values for velocity, position and pose. By processing the base system sensor data for at least some of the BNS output values sensor data is integrated. This of course results in an error of the respective output value that changes over time and results in increasing inaccuracy of the output data with time.

The correction system 3 comprises correction system sensors 8. These correction system sensors 8 in case of a GPS measurement for correcting the output data deliver GPS raw data measurements that contain the measured distance between satellites and the receiver antenna. Other sources for obtaining correction system sensor data are also possible, of course.

The base system sensor data which is output by the base system sensors 4 includes a time stamp indicating the time of sensing. The base system sensor data is stored in a first memory 5. Advantageously, only a certain amount of base system sensor data is stored in the first memory 5. The time interval for which the data is stored in the first memory 5 depends on a maximum lag time for example, which will be explained afterwards in more detail. Also the base navigation system output values that are produced by processing the base navigation sensor data by this strap-down algorithm in the processing unit 6 are stored in a second memory 7. Again, the output values are associated with a time stamp. This time stamp in that case does not indicate the time of calculating the output values but the time corresponding to the sensing that is the basis for the calculation for the output values. It is to be noted that due to the low computational cost that the processing of the input base navigation sensor data requires, the time lag between inputting the data into the processing algorithm and outputting the output values can be neglected.

Furthermore, time stamps are also associated with the correction system sensor data, again indicating the point in time when the respective sensing took place. The correction system sensor data is stored in a third memory 9 associated with its corresponding time stamp.

The correction algorithm unit 10 is established by a fusion filter such as an extended error state space Kalman-filter. Such extended error state space Kalman-filter per se is already known in the art and is suitable of calculating correction values from input data. In the present case the correction algorithm unit 10 is supplied with data stored in the first memory 5, the second memory 7 and the third memory 9. It is to be noted that distinguishing between the first, the second and the third memory 5, 7, 9 is only made for illustrative reasons. Of course, only a single memory may be used to store all the different values.

The selection of the data and values that are supplied to the correction algorithm unit 10 is controlled by the selection and control unit 11 that selects base navigation system data from the first memory 5, base navigation output values from the second memory 7 and correction sensor data from the third memory 9 having corresponding time stamps. Thus, the error correction calculation performed by the Kalman filter is performed on the basis of timely corresponding data only which results in time consistency of the output values.

It might occur that no fully corresponding set of data can be achieved. In that case, an interpolation is performed in interpolation unit 12. The interpolation unit 12 therefore receives from the first memory 5 and the second memory 7 values that allow interpolating values that then match the time stamp of the correction sensor data that is supplied to the correction algorithm unit 10.

On the basis of the thus corresponding base navigation sensor data, base navigation output values and correction system sensor data then correction values and correction increments are calculated. The correction increments are used to correct a change of the error over time whereas the correction values are applied as a constant value. Thus, the correction value corrects errors that have low dynamic. Such errors are for example sensor offset or scale factor errors. Contrary, the correction increments correct errors that are mainly caused by processing data containing yet uncorrected constant errors. One example is the correction of the calculated velocity that requires the integration of accelerometer data. The calculation of such correction increments can be easily done since the change of such errors is systematically known from the processing algorithm of the strap-down algorithm.

It is furthermore to be noted that because of such integration or summing up of residual errors on the input side of the strap-down algorithm, also random errors like for example noise may contribute to an overall error.

Figure 2:
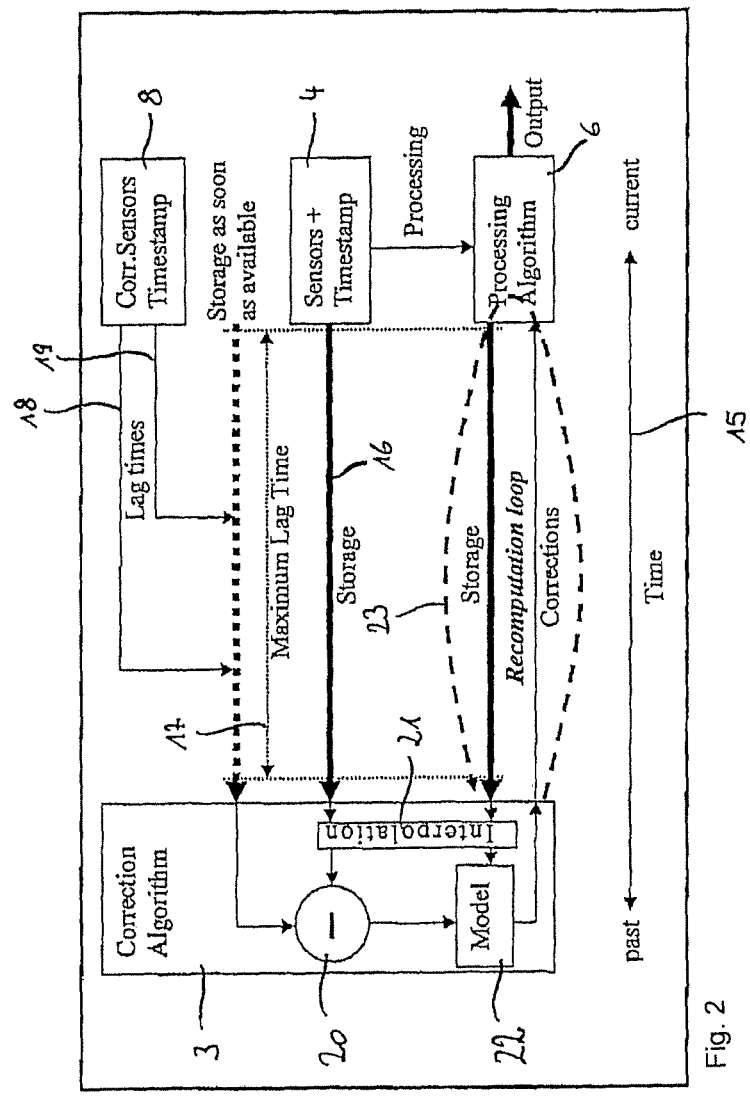
FIG. 2 a diagram to illustrate the method steps of the invention and in particular their time relation.

In FIG. 2 there is illustrated the method according to the invention as it is implemented in an integrated navigation system. In order to indicate that the correction algorithm is running "in the past" whereas the base navigation system and thus the strapdown algorithm runs "in the present" a time line 15 is shown. The terms "in the past" and "in the present" indicate the time of the data that are used for the method steps of the correction system and the base navigation system as it is explained in the following sections. Thus, it refers to the time stamps of the base navigation system sensor data, the base navigation system output values and the correction system sensor data. As already explained at first sensor data from the base navigation system sensors 4 are generated and provided with time stamps. These sensor data are stored for further use in the correction system 3 as relate to by the thick arrow 16. But the base navigation system sensor data is not only stored but also immediately processed by the processing algorithm unit 6 in a strap-down algorithm there. The output values of the strap-down algorithm are output for further use in external applications or the like, but are also stored as indicated by black arrow 25 for later use in the correction system 3. It is to be noted that any time processing of data is mentioned it is evident that such processing is performed in a processing unit that can comprise either a plurality of CPU's or a single one.

Furthermore, a maximum lag time as indicated by interval 17 is defined. Any new data that is generated by the base navigation sensors 4 are added to the first memory 5 so that for anytime of the interval with the maximum lag time any sensor data of the base navigation system sensors 4 is available or can be interpolated. During the maximum lag time interval 17 also correction system sensor data from the respective sensors 8 are available. The correction system sensors also provide the data with time stamps that correspond to the time of sensing. The correction system sensor data is also stored as soon as it is available to the correction system 3. With arrows 18, 19 it is indicated that these data may be available for further processing only at a later point in time. It can be seen that the original sensing of the correction sensor data by the correction system sensor 8 and the base navigation system sensors 4 occurs at the same time, to be more precise at the current point in time according to the time line 15. Nevertheless the time lag being the delay in availability of the different data for further processing is the reason why the correction algorithm has to await until the correction system sensor data may be processed. Thus, in addition to the base navigation system sensor data also the correction sensor system data that are available within the maximum lag time are stored in the third memory 9 as indicated in FIG. 1.

After the maximum lag time elapsed the data corresponding with respect to the time stamps is supplied to the fusion filter. It is to be noted that for illustrating that the correction sensor data may be available only at different points in time the arrows 18, 19 are used. The storing itself may be performed within the correction system 3.

After the maximum lag time has expired, base navigation system data and correction system data are supplied to the processing unit executing the correction algorithm by means of a fusion filter. As indicated by reference numeral 20 in the algorithm there is calculated an error between the output values resulting from the base navigation sensor data and the correction system sensor data. Furthermore an interpolation unit 21 interpolates from the base navigation sensor data supplied to the fusion filter that exactly corresponds with respect to time to the time stamps of the correction sensor system data, in case that the time stamps of the base navigation sensor data and the time stamps of the correction system sensor data may not coincide precisely. For the correction algorithm then the interpolated data is used.

Using data in the correction algorithm that have corresponding sensing times ensures that all the measurements can be processed in the order of measurement instead of the order of their arrival. This is achieved by storing the respective sensor data until they are processed and results in time consistency.

The data are fed to a model 22 in which the distinction between the constant errors and the errors changing over time is performed. Examples for such constant or at least low dynamic errors may be sensor offsets or scale factor errors. Apart from that and as mentioned earlier there are also errors that are caused by processing data in the strap-down algorithms. Thus, if data still containing uncorrected errors are supplied to the strap-down algorithm such errors will add up or be integrated depending on the processing algorithms. But as the algorithms used in the strap-down algorithms are known also such errors are systematically known.

This allows calculating not only correction values for the constant errors but also correction increments describing the change of an error for a unit in time and with respect to a particular BNS output such as velocity. After the correction values and the correction increments have been computed they are applied. Firstly, the constant values are applied to the base navigation sensor data that is stored and that was collected in the past. Using corrected base navigation sensor data then the processing algorithm in unit 6 is run again. The base navigation output values are then corrected using the correction increments, thus taking care of the changing error over time. This means that an output value being calculated from earlier base navigation sensor data and output values calculated from later base navigation sensor data are corrected using the correction increments. This reflects the integration of an uncorrected error due to processing. The model that is executed in 22 by the fusion filter reflects for each of the different outputs of the strap-down algorithm in which way errors of input data of the strapped-down algorithm integrate or sums up.

After the corrected base navigation sensor data has been recalculated by the strap-down algorithm it is again stored, still with the respective time stamps, and is used for future correction cycles. This is integrated by the re-computation loop illustrated by the dashed error 23.

The constant values that are output by model 22 are also stored in a memory and thus are available if no current correction measurement can be used for calculating the correction increments. In that case, the base navigation system 2 runs in a stand-alone mode.

Anytime new correction values and new correction increments are available, the already stored base navigation system sensor data will be used to re-compute the base navigation output values. The corrected output values then overwrite the stored output values with matching time stamps. Thus, all the data that is available up to the most recent, present measurement are corrected on the latest results.

The algorithm is repeated for every base system measurement step. The recomputation is done if correction data was available.

It is to be noted that although the examples given are all directed to a navigation system, this is no limitation for application of the inventive method. The method is suitable for all multi-sensor fusion systems where the estimated properties are expected to have neglectable dynamics within the time lag of the slowest sensor defining the maximum lag time, and errors of such property may accumulate in another one. These assumptions are explicitly valid for systems which deal with error estimation such as error-state-filters.

Typically, for use in an integrated navigation system as described above, the base navigation system uses sensors like an IMU (Inertial Measurement Unit) as a base system and correction measurements performed by (differential) GNSS (Global Navigation Satellite System), odometry, barometer, magnetometer, radars, (stereo)vision, laser scanners, rangefinders, landmarks, radio location, etc, which are not only used as correction sensors, but also become mutually corrected. Such mutual correction is typically conducted in so-called tightly coupling architectures which do not only correct the base navigation system, but also its correction measurement sensors. The sensors as described above, typically are not permanently available and have different, asynchronous and possibly non-constant sampling rates and particularly a different and varying lag time. Since the system has a defined maximum lag time and takes account of the measurements in the correct time order, the system adapts itself to such varying lag times.

The system can also be used with service robots, for example autonomous lawn mowers, cleaning applications and the like. But also applications in error space and seafare are feasible as well.

The invention claimed is:

1. A method for correcting errors of measurement system output, the system comprising a base measurement system base system and a correction system, the method comprising the steps of:
    acquiring base system sensor data and providing the base system sensor data to a processing algorithm,
    storing the base system sensor data associated with a time stamp indicating the time of sensing,
    calculating base system output values by processing the base system sensor data in the processing algorithm,
    storing the calculated base system output values with associated time stamp indicating sensing time of the sensor data which are the basis for the calculated base system output values,
    acquiring correction system sensor data associated with a time stamp indicative of the time of sensing,
    supplying the base system sensor data, the base system output values and the correction system sensor data with corresponding time stamps to a fusion filter,
    calculating, by the fusion filter, correction values for correcting constant errors considered not to change during a lag time by calculating an error between the base system output values and the correction system sensor data having corresponding time stamps and correction increments for correcting errors caused by processing the base system sensor data containing yet uncorrected errors, wherein the correction increments reflect a change of an error in the base system output value over time due to integration or summing up the base system sensor data in the processing algorithm,
    applying respective correction values to the base system sensor data to generate corrected base system sensor data and generating recalculated base system output values by processing the corrected base system sensor data by the processing algorithm to generate recalculated base system output values,
    applying the correction increments to the recalculated respective base system output values to generate corrected base system output values and storing the corrected base system output values, and outputting most recent output values of the processing algorithm for further data processing, wherein latest calculated correction values are stored, and in a case that no correction system sensor data with a lag time shorter than a predetermined threshold is available, a correction is performed only based on the stored correction values.

2. The method according to claim 1, wherein a plurality of correction system sensor data is collected by storing the correction system sensor data in storage associated with their respective time stamps.

3. The method according to claim 1, wherein the correction system sensor data having a lag time exceeding a predetermined threshold are discarded.

4. The method according to claim 1, wherein the processing algorithm is a strap-down algorithm in a base navigation system.

5. The method according to claim 1, wherein the fusion filter is an Extended Error Space Kalman-Filter.

6. An integrated navigation system, comprising:

a base navigation system as a base measurement system, and a correction system, wherein the base navigation system and the correction system are configured to perform the steps of acquiring base system sensor data and providing the base system sensor data to a processing algorithm, storing the base system sensor data associated with a time stamp indicating sensing time of the sensor data which are the basis for the calculated base system output values, calculating base system output values by processing the base system sensor data in the processing algorithm, storing the calculated base system output values with associated time stamp, acquiring correction system sensor data associated with a time stamp indicative of the time of sensing, supplying the base system sensor data, the base system output values and the correction system sensor data with corresponding time stamps to a fusion filter, calculating, by the fusion filter, correction values for correcting constant errors considered not to change during a lag time by calculating an error between the base system output values and the correction system sensor data having corresponding time stamps and correction increments for correcting errors caused by processing the base system sensor data containing yet uncorrected errors, wherein the correction increments reflect a change of an error in the base system output value over time due to integration and/or summing up the base system sensor data in the processing algorithm, applying respective correction values to the base system sensor data to generate corrected base system sensor data and generating recalculated base system output values by processing the corrected base system sensor data by the processing algorithm, applying the correction increments to the recalculated base system output values to generate corrected base system output values and storing the corrected base system output values, and outputting most recent output values of the processing algorithm for further data processing, wherein latest calculated correction values are stored, and in a case that no correction system sensor data with a lag time shorter than a predetermined threshold is available, a correction is performed only based on the stored correction values.

7. The integrated navigation system according to claim 6, wherein the base navigation system comprises a inertial measurement unit, a processing unit configured to carry out a strap-down algorithm, and a fusion filter.

8. The integrated navigation system according to claim 6, wherein the correction system comprises at least one of GNSS, odometry, barometer, magnetometer, radars, stereo vision, laser scanners, ultrasonic rangefinders, landmarks, radio location.

* * * * *